United States Patent [19]
Wengel

[11] 4,026,067
[45] May 31, 1977

[54] PLANT TURNTABLE

[75] Inventor: Sheldon M. Wengel, Reedsburg, Wis.

[73] Assignee: Gerber Products Company, Fremont, Mich.

[22] Filed: Oct. 31, 1975

[21] Appl. No.: 627,814

[52] U.S. Cl. .................................. 47/39; 47/71; 211/1.5; 248/131; 248/349
[51] Int. Cl.[2] ...................... A47G 7/02; A01G 9/04
[58] Field of Search ..................... 47/39, 38, 34.12; 248/131, 349; 211/77, 78, 129, 131, 144, 163, 1.5; 108/139; 40/106.21, 106.22; 239/17, 20, 22, 23

[56] References Cited
UNITED STATES PATENTS

| | | | |
|---|---|---|---|
| 764,307 | 7/1904 | Scahill | 47/39 |
| 1,754,094 | 4/1930 | Glass, Sr. | 248/349 X |
| 1,859,352 | 5/1932 | Albee | 47/39 |
| 1,885,117 | 11/1932 | Lemert | 248/131 X |
| 2,003,986 | 6/1935 | Witthuhn | 47/39 |
| 2,648,514 | 8/1953 | Rosier et al. | 248/131 |
| 3,331,515 | 7/1967 | Lange | 211/144 X |
| 3,360,885 | 1/1968 | St. Clair | 47/40 |
| 3,380,190 | 4/1968 | Granger | 248/349 X |

FOREIGN PATENTS OR APPLICATIONS

| | | | |
|---|---|---|---|
| 118,744 | 9/1918 | United Kingdom | 47/39 |
| 9,421 | 10/1908 | United Kingdom | 47/39 |

*Primary Examiner*—Edgar S. Burr
*Assistant Examiner*—Steven A. Bratlie
*Attorney, Agent, or Firm*—Townsend and Townsend

[57] ABSTRACT

A plant turntable having a power supply for the rotation of a potted plant and the like. The turntable includes an imperforate disc supported by a ring-mounted ball bearing assembly for the support of the potted plant which is driven by the shaft of a geared motor mounted directly below in a base. A transverse pin through the drive shaft engages a slot in the turntable axle to provide the driving torque for rotating the turntable. The base forms a motor and battery enclosure. The top of the base includes a ridge adjacent to the periphery of the base beyond the rim of the disc to capture water which may gravitate from a potted plant resting on the disc, and further includes a ridge about the motor shaft to protect the motor from water leakage through the shaft hole. The top further includes a plurality of openings for draining water therefrom. The lower portion of the base includes a concealed reservoir isolated from the motor and battery enclosure about the periphery thereof for capturing and draining water from the base top, thereby preventing damage to enclosed components.

2 Claims, 2 Drawing Figures

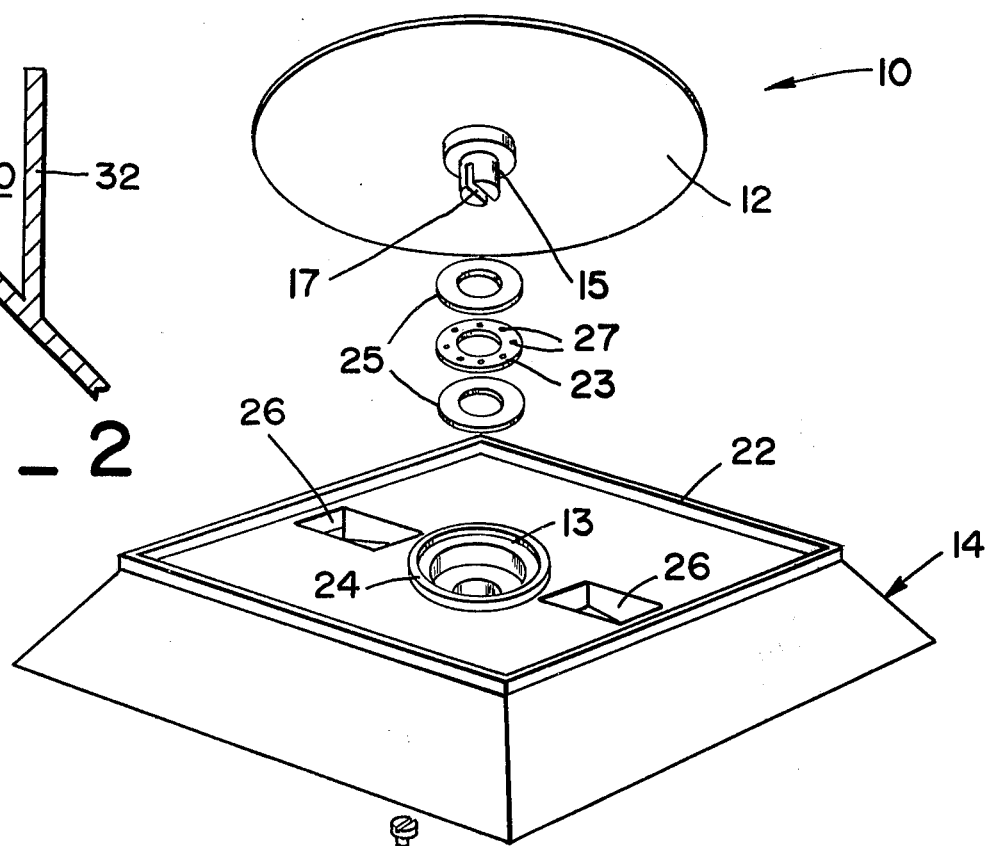
FIG_1
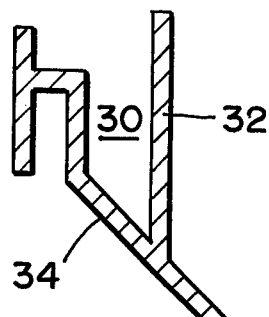
FIG_2

PLANT TURNTABLE

BACKGROUND OF THE INVENTION

1. Field of the Invention

The present invention relates in general to potted plant rotators and specifically to means for supporting loads and for protecting the internal components of a plant rotator from damage due to water leakage.

Potted plant rotators are known for promoting symmetrical growth of light-seeking, house-grown potted plants. The electrical components of a plant rotator are subject to damage from spilled or overflowing water provided to the potted plant. It is therefore necessary to provide protection for the electrical components.

SUMMARY OF THE INVENTION

According to the invention, the plant turntable is provided having a self-contained power supply for the rotation of a potted plant and the like. The turntable includes an imperforate disc suspended by a ring-mounted ball bearing assembly for the support of the potted plant, which is driven by the shaft of a geared motor mounted directly below in a base. A transverse pin through the drive shaft engages a slot in the turntable axle to provide the tension for rotating the turntable. The base forms a motor and battery enclosure. The top of the base includes a ridge adjacent to the periphery of the base beyond the rim disc to capture water which may gravitate from a potted plant resting thereon and a ridge about the motor shaft for protecting the components from water leakage through the shaft hole. The top further includes a plurality of openings for draining water therefrom. The lower portion of the base includes a concealed reservoir isolated from the motor and battery enclosure about the periphery thereof for capturing and draining water from the base top, thereby preventing damage to enclosed components.

Further objects and advantages of the present invention will be apparent by reference to the following detailed description.

BRIEF DESCRIPTION OF THE DRAWINGS

FIG. 1 is a partial cutaway view of a plant turntable according to the present invention; and FIG. 2 is a cross-section of the rim of the base.

DETAILED DESCRIPTION OF SPECIFIC EMBODIMENTS

Referring to FIGS. 1 and 2, there is shown a turntable referred to generally as 10, having a support disc 12 coupled, through a shaft opening 13 in a base top 14, to a shaft 16 driven by a geared motor 18. The disc 12 includes an axle 15 having a slot 17. The shaft 16 includes a transverse pin 19 engageable with the slot 17 when the support disc 12 is mounted to the shaft 16. The slot 17 and transverse pin 19 cooperate to rotate the disc 12. The geared motor 18 is mounted to a base 20, the interior of which is disposed to receive and couple batteries for powering the geared motor 18.

The floor of the interior of the base 20 is sealed so as to retain battery acid if the batteries were to leak. The geared motor 18 is typically a small highly efficient DC motor geared to drive a shaft at rotational speeds typically between ¼ and 3 rpm.

According to the invention, the base top 4 is provided with outer ridge 22 adjacent to the periphery thereof and beyond the rim of the disc 12, thereby forming a reservoir for capturing water which may gravitate from a potted plant (not shown) resting on the disc 12. An inner ridge 24 is disposed about the shaft opening 13 at sufficient height to minimize the possibility of water overflow into the interior of base 20. The area between the outer ridge 22 and the inner ridge 24 defines a reservoir drainage from which is provided by at least one but preferably a plurality of drainage holes 26. A plurality of drainage holes 26 symmetrically disposed with respect to the shaft opening 13 promotes efficient drainage by non-horizontal orientations in the reservoir.

A disc-shaped bearing assembly 23 and a pair of flat hardened annular plates 25 disposed on either side of the bearing assembly 23 respectively confronting the disc 12 and the base top 14 support the load of the disc 12. The bearing assembly 23 may comprise a race in which are retained ball bearings 27 which ride against annular plates 25. The bearing assembly 23 provides for relatively low friction support of loads on the disc 12 which relieves the shaft 16 of axial loading tending to cause excessive wear to the motor 18.

The base top 14 is disposed to be mounted upon the base 20 in an orientation permitting drainage through the drainage holes 26 into cavities 28. A trough 30 defined by a rim 32 and the wall of the base 34 connects the drainage cavities 28. A cross-section of the trough 30 is shown in FIG. 2. The rim 32 isolates the inner portion of the base 20 enclosing the motor and batteries. When the base top 14 is in place, the cavities 28 and trough 30 are hidden from view and isolated from the interior of the base 20.

The volume of the cavities 28 and trough 30 is sufficient under contemplated conditions to provide adequate storage of excess water captured therein. The surface area provided by the cavities 28 and trough 30 are also generally sufficient to permit evaporation of captured water at a satisfactory rate.

The unit is especially adapted for battery operation. Appropriate marking may be provided in the base 20 to indicate the preferred orientation of the batteries for proper motor polarity. Marking may be by means of a symbol, notation, color coding or the like.

The invention has been described with respect to specific embodiments. Other embodiments incorporating essential features of the invention will be obvious to one of ordinary skill in the art. It is not intended that the invention be limited except as indicated by the appended claims.

What is claimed is:

1. A plant turntable having power means for the rotation of a potted plant comprising:

a hollow base having an interior with a chamber and an exterior;

a base top removably supported upon said base for accessing said interior;

a disc for the support of a potted plant;

bearing means for rotatably supporting said disc upon said base top;

a geared motor mounted to said base within said interior chamber and coupled to a power source, said geared motor having a shaft extending vertically upward from said base and removably coupled to said disc for rotating said disc;

said base including a wall and a rim adjacent said wall defining a water trough around the periphery of said base, said water trough being isolated from the remaining interior of said base and hidden beneath said base top;

a base top having therein an opening for said shaft, a first raised ridge around said bearing means to minimize the possibility of liquid overflow into said shaft opening, and a second ridge around said first raised ridge located around the periphery of said base top defining a reservoir for capturing liquid from the rotated potted plant; and drainage means within said reservoir below said disc and in said base top for directing liquid flow into said water trough; said disc being non-perforate and said second ridge being disposed outside of the radius of said disc for retaining liquid overflow from the margins of said disc.

2. A plant turntable according to claim 1, further including at least two interior cavities isolated from said motor containing chamber and for receiving liquid overflow, wherein said base top reservoir is substantially planar and said drainage means comprises a plurality of openings disposed in pairs symmetrical with said shaft opening for drainage into said trough and cavities.

* * * * *